United States Patent
Cray et al.

(10) Patent No.: US 9,175,198 B2
(45) Date of Patent: Nov. 3, 2015

(54) PROCESS FOR THE PREPARATION OF A SILICONE PRESSURE-SENSITIVE ADHESIVE

(71) Applicant: Dow Corning Corporation, Midland, MI (US)

(72) Inventors: Stephen Edward Cray, Sully (GB); Delphine Davio, Le Roeulx (BE); Robert Alan Ekeland, Greer, SC (US); Andreas Stammer, Pont-A-Celles (BE)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/137,074

(22) Filed: Dec. 20, 2013

(65) Prior Publication Data

US 2014/0114029 A1    Apr. 24, 2014

Related U.S. Application Data

(62) Division of application No. 13/391,997, filed as application No. PCT/US2010/046487 on Aug. 24, 2010, now abandoned.

(60) Provisional application No. 61/236,576, filed on Aug. 25, 2009.

(51) Int. Cl.
*C08G 77/44* (2006.01)
*C09J 7/02* (2006.01)
*C09J 183/04* (2006.01)

(52) U.S. Cl.
CPC .............. *C09J 183/04* (2013.01); *C08G 77/44* (2013.01)

(58) Field of Classification Search
CPC ................................ C08G 77/44; C09J 183/04
USPC ................. 525/477, 474; 528/10, 21
See application file for complete search history.

(56) References Cited

U.S. PATENT DOCUMENTS

| | | | | |
|---|---|---|---|---|
| 3,839,388 A | * | 10/1974 | Nitzche | 556/450 |
| 5,391,673 A | * | 2/1995 | Ekeland et al. | 528/12 |
| 5,861,472 A | * | 1/1999 | Cifuentes et al. | 525/477 |
| 2012/0022210 A1 | | 1/2012 | Davio et al. | |

FOREIGN PATENT DOCUMENTS

| | | |
|---|---|---|
| EP | 0771862 A1 | 5/1997 |
| EP | 0816463 A2 | 1/1998 |
| EP | 0816464 A2 | 1/1998 |
| EP | 0867493 A2 | 9/1998 |
| EP | 1398361 A1 | 3/2004 |
| GB | 2445821 | 7/2008 |
| JP | H 10-060408 A | 3/1998 |
| WO | WO02092716 | 11/2002 |
| WO | WO02092717 | 11/2002 |
| WO | WO2006106095 | 10/2006 |
| WO | WO2006106359 | 10/2006 |
| WO | WO2006106360 | 10/2006 |
| WO | WO2006106361 | 10/2006 |
| WO | WO2006106362 | 10/2006 |
| WO | WO2006107762 | 10/2006 |
| WO | WO2007067332 | 6/2007 |
| WO | WO 2007067332 A2 * | 6/2007 |
| WO | WO2008043512 | 4/2008 |
| WO | WO2008045395 | 4/2008 |
| WO | WO2008045417 | 4/2008 |
| WO | WO2008045427 | 4/2008 |
| WO | WO2008045446 | 4/2008 |

OTHER PUBLICATIONS

Engineer's Toolbox—Dynamic, Absolute and Kinematic Viscosity, Feb. 9, 2006.*
Sigma Aldrich—Polydimethylsiloxane, hydroxy terminated data sheet, Jan. 2014.*
Pocius, Chapter 11 of Adhesion Science and Engineering: Surface, Chemistry and Applications, pp. 506, 508, Nov. 14, 2002.*
Written Opinion of the International Searching Authority Application No. PCT/US2010/046487, dated Dec. 9, 2010, 5 pages.
International Search Report Application No. PCT/US2010/046487, dated Dec. 9, 2010, 3 pages.
English language abstract and machine-assisted English translation for JPH 10-060408 extracted from espacenet.com database on May 18, 2015, 18 pages.

* cited by examiner

*Primary Examiner* — Randy Gulakowski
*Assistant Examiner* — Christopher M Rodd
(74) *Attorney, Agent, or Firm* — Howard & Howard Attorneys PLLC (57) ABSTRACT

Silicone pressure sensitive adhesive (PSA) compositions and methods for their preparation are provided. In one embodiment, PSAs are formed from a silicone polymer mixture by condensation polymerization of low viscosity polyorganosiloxanes in inert solvents and/or silicone fluids, and optionally adding a silicone resin (MQ) during polymerization. The silicone polymer mixture formed may also be mixed with a silicone resin (MQ) and bodying catalyst, and bodying is allowed to continue until the desired reaction product is formed.

18 Claims, 2 Drawing Sheets

PROCESS FOR THE PREPARATION OF A SILICONE PRESSURE-SENSITIVE ADHESIVE

RELATED APPLICATIONS

This application is a divisional of U.S. patent application Ser. No. 13/391,997, filed on Feb. 23, 2012, which claims priority to and all the advantages of International Patent Application No. PCT/US2010/046487, filed on Aug. 24, 2010, which claims priority to and all the advantages of U.S. Provisional Application No. 61/236,576, filed on Aug. 25, 2009, the contents of which are incorporated herein by reference.

In various embodiments, the application relates to silicone pressure sensitive adhesive (PSA) compositions and methods for their preparation.

Silicone pressure-sensitive adhesives were introduced into the market in the mid-1950s and have since been the subject of ongoing development focused on improving performance capabilities (especially at extreme temperatures) in order to meet increasing demands in various industries and applications. Despite such development, the primary components of conventional PSAs remain (i) a high molecular weight linear silicone polymer with silanol functionality at the polymer chain ends, (ii) a highly condensed low molecular weight silicate resin (MQ) with silanol functionality on its surface, and (iii) a solvent.

Known methods of manufacturing PSAs involve mixing a silicone polymer (usually polydimethyl siloxane-based or polydimethyl-diphenyl siloxane-based), a MQ resin, and a catalyst in a hydrocarbon solvent, followed by heating to promote bodying (i.e. condensation) between the respective silanol functionalities of the resin and polymer. After bodying, most silicone PSAs known in the art undergo further cross-linking to enhance cohesive strength. Known cross-linking methods utilize either a peroxide-catalyzed free-radical cure system or a platinum-catalyzed addition cure system.

PSA performance properties are controlled by, among other things, a critical balance of molecular weights/viscosities of the silicone polymer, the structure of the silicone polymer, molecular weights/viscosities of the MQ resin, the ratio of polymer to resin, type and level of functionality on the polymer and resin, and the process conditions (for example, reaction time and temperature) of manufacture. Slight variations can have dramatic effects on the PSA properties.

While PSAs and their methods of manufacture are well known, there is a need in the art for new PSAs to meet the needs of new applications, as well as to meet new performance demands for known applications. Such needs arise from, among other things, increased use of chemical fasteners instead of mechanical fasteners, increased use of PSAs in high temperature applications (for example, electronics), increased use of PSAs on temperature-sensitive substrates, and increased use of PSAs in applications where volatile cyclosiloxanes (for example, octamethylcyclotetrasiloxanes and decamethylcyclopentasiloxanes) and other byproducts/impurities arising from methods of preparing the silicone polymer component must be minimized.

These and other needs in the art are met by embodiments of the present invention. Provided in various embodiments are silicone PSAs and methods for their preparation. According to certain aspects, the inventive method of preparing PSAs involves forming silicone polymers by condensation polymerization of low viscosity polyorganosiloxanes in inert solvents (for example, toluene or xylene) and/or silicone fluids (for example, polydimethylsiloxane). According to other aspects, a silicone resin is optionally mixed with the silicone polymer during polymerization and condensation is allowed to continue before the addition of (where required) a neutralizing agent. In further aspects, a silicone resin, bodying catalyst, and the silicone polymer mixture are mixed and bodying is allowed to continue until the desired reaction product is formed. In additional aspects, the reaction product is cured by the addition of an organic peroxide.

In some aspects, in addition to silicone resins, other solid particles, coupling agents (for example, alkoxysilanes such as tetraethoxysilane and tetraorthotitanates), and cross-linking agents can be added to and further bodied with the silicone polymer. In other aspects, the silicone polymer can be prepared using mixed intermediates (for example, methylphenyl siloxanes or methyl trifluoropropyl siloxanes) in conjunction with the low viscosity polyorganosiloxanes, yielding co-polymers that can lead to improved PSA properties. In additional aspects, condensation polymerization for formation of the silicone polymer can be carried out in the presence of trialkoxyphenylsilanes, tetraalkoxysilanes, and other silanes selected to introduce branching into the silicone polymer, which allows for tailoring of adhesive properties and viscosities of the PSAs. For example, condensation polymerization to form the silicone polymer can occur in the presence of trimethoxyphenylsilane, tetraethoxysilane, or combinations thereof in order to introduce branching into the resulting silicone polymer.

These and additional features and advantages of the invention will become apparent in the course of the following detailed description.

A more complete appreciation of the invention and the many embodiments thereof will be readily obtained as the same becomes better understood by reference to the following detailed description, when considered in connection with the accompanying drawings, wherein:

FIG. 2 illustrates hot peel testing of PSA compositions in accordance with embodiments of the invention. An adhesive tape is applied to a stainless steel plate and then subjected to a temperature of 250-270° C. for a period of 10 minutes. The plate is then removed from the oven and the adhesive tape is quickly removed. The appearance of a residue left by the adhesive on the plate indicates failure in this particular test. The test has been given a number scale to indicate the amount of residue left on the plate, with 0 being total adhesive failure, and 5 meaning that no adhesive residue can be detected on the plate. The chart illustrates that hot peel performance can be maximized by the use of higher molecular weight polymers. Also, what is shown is that the molecular weight required for excellent hot peel performance is higher in linear polymers than that which is required for excellent performance from branched polydimethylsiloxane polymers. The last two data points represent conventional, commercially-available samples of silicone PSAs.

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting.

As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

The term "silicone fluid," as used in the specification and appended claims, is intended to mean a substantially non-volatile and non-reactive silicone-based fluid that generally does not chemically participate in a polymerization reaction or otherwise chemically interact with additives introduced in any steps of the described process. The inert fluid may or may not be removed during the process.

As used in the specification and appended claims, the term "silicone polymer" is intended to mean a polymer comprising multiple organosiloxane or polyorganosiloxane groups per molecule. The term includes, but is not limited to, polymers substantially containing only organosiloxane or only polyorganosiloxane groups in the polymer chain, and polymers where the backbone contains both organosiloxane and polyorganosiloxane groups in the polymeric chain.

The term "substituted," as used in the specification and appended claims in relation to hydrocarbon groups, means one or more hydrogen atoms in the hydrocarbon group has been replaced with another substituent. Examples of such substituents include, but are not limited to, halogen atoms such as chlorine, fluorine, bromine, and iodine; halogenated organic groups such as chloromethyl, perfluorobutyl, trifluoroethyl, and nonafluorohexyl; oxygen atoms; oxygen-containing groups such as (meth)acrylic and carboxyl; nitrogen atoms; nitrogen atom containing groups such as amines, amino-functional groups, amido-functional groups, and cyano-functional groups; sulfur atoms; and sulfur atom containing groups such as mercapto groups.

As used in the specification and appended claims, the term "extender" means a compound typically used to dilute a silicone-based product to make the product more economically competitive without substantially affecting the properties of the product.

The term "plasticizer," as used in the specification and appended claims, means a compound that is added to silicone-based compositions to increase the flexibility and toughness of the polymer product. This is generally achieved by reduction of the glass transition temperature ($T_g$) of the cured polymer composition, thereby enhancing the elasticity of the elastomer (for example, a sealant).

As used in the specification and appended claims, the terms "bodied" and "bodying" mean a condensation reaction between the functional hydroxyl groups of a silicone polymer and the functional hydroxyl groups of a silicone resin in order to increase molecular weight or crosslinking, or both.

The terms "viscosity" and "solution viscosity," as used in the specification and appended claims, mean the viscosity of a compound wherein about 30-70% of the compound is dissolved in a solvent. In some aspects, 45-55% of the compound is dissolved in a solvent. Solution viscosities were measured using standard procedures with a Brookfield Rotational Viscometer Model DVII+ using Spindle RV7 and rotational speeds between 0.3 RPM to 100 RPM dictated by the fluid being tested. Measurements were made at standard conditions.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The invention provides, in certain aspects, novel silicone pressure-sensitive adhesive (PSA) compositions and methods of making such compositions. In embodiments of the present invention, the PSA compositions are made by a method comprising the sequential steps of: (i) forming a silicone polymer by condensation polymerization of at least one polyorganosiloxane in the presence of at least one hydrocarbon solvent or silicone fluid; optionally, (ii) mixing with the silicone polymer, a silicone resin that has at least one hydroxyl group capable of undergoing condensation polymerization and that is soluble in at least one hydrocarbon solvent or silicone fluid; (iii) allowing condensation polymerization to continue before addition of, where required, a neutralizing agent; (iv) adding at least one bodying catalyst and a silicone resin having at least one hydroxyl group capable of undergoing bodying and that is soluble in at least one hydrocarbon solvent or silicone fluid; (v) allowing bodying between the silicone polymer and the silicone resin to continue until the desired reaction product is formed; and (vi) optionally, adding an organic peroxide and allowing the pressure-sensitive adhesive to cure. In some embodiments, condensation polymerization to form the silicone polymer of (i) is carried out in the presence of one or more silanes selected to introduce branching into the polymer.

In certain aspects, the PSA compositions made by the present invention have silicone polymer components with a diverse range of polymer structures, molecular weights and viscosities (including, but not limited to, molecular weights greater than 1,000,000 g/mol and corresponding 50% solids solution viscosities), as well as diverse organic groups. In other aspects, the PSA compositions made by the present invention have low cyclosiloxane content (defined herein as <0.1 weight % of a particular cyclosiloxane) and/or other by-products and impurities. For example, the PSA compositions made by the present invention may have <0.1 weight % octamethylcyclotetrasiloxanes, <0.1 weight % decamethylcyclopentasiloxanes, and/or <0.1 weight % larger cyclosiloxanes.

Figure 2:
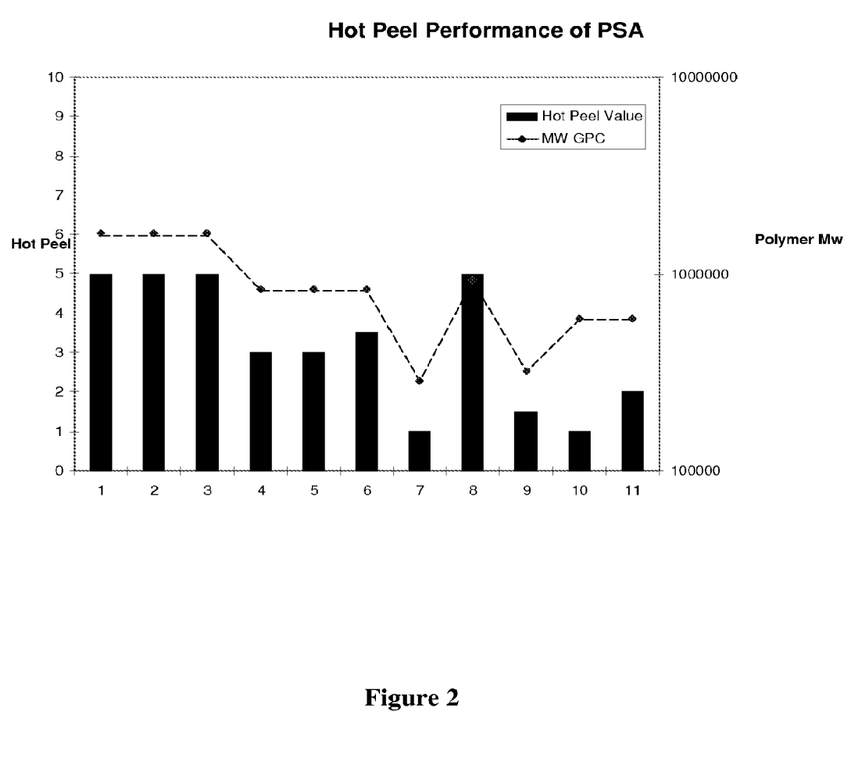

Embodiments of the inventive method allow for PSA compositions characterized as having improved performance characteristics (including, but not limited to, adhesion and tack), as compared to conventional PSA compositions. For example, such PSA compositions have superior performance in the hot peel test with which the skilled artisan will be familiar. Essentially, the hot peel test involves applying a PSA composition to a stainless steel plate and then subjecting it to a temperature of 250-270° C. for a period of time (for example, 10 minutes) and then quickly removing it. The degree of residue left on the plate is evaluated. In some aspects, PSA compositions prepared by the inventive method embody the inventors' discovery that hot peel performance can be maximized by the use of high molecular weight silicone polymers in the PSA compositions, and that the molecular weight required for excellent performance is higher in linear polymers than in branched polymers.

According to embodiments of the invention, PSA compositions are made by a method wherein the silicone polymer component of the PSA is formed by condensation polymerization of at least one polyorganosiloxane in the presence of at least one hydrocarbon solvent or silicone fluid. The polyorganosiloxane may be linear, substantially linear, or branched. In some aspects, linear or substantially linear low molecular weight/low viscosity polyorganosiloxanes having reactive hydroxyl groups are used as starting materials for condensation polymerization. For example, such polyorganosiloxanes can be generally characterized by formula (I):

$$R^1O[R^2R^3SiO]_xH \quad (1)$$

wherein each R is independently selected from a hydrogen atom, an alkyl or substituted alkyl group containing 1 to 8 carbon atoms, an aryl or substituted aryl group containing 1 to 8 carbon atoms, and wherein x is an integer with a value of at least 2. In certain aspects, x is an integer with a value range of 2-80. In other aspects, x is an integer with a value range of 3-49. In additional aspects, x is an integer with a value range of 50-80. Examples of R include, but are not limited to, methyl, ethyl, propyl, isopropyl, butyl, sec-butyl, iso-butyl, tert-butyl, perfluorobutylethyl, phenyl ethyl, chloropropyl, fluoropropyl, vinyl, and phenyl.

With the presence of various groups in the polymeric chain, a polymer may comprise a modest degree of branching and still be considered "linear" or "substantially linear," as the terms are used herein. In some aspects, branching is less than 10%. In other aspects, branching is less than 2%. For reference, a significantly branched polymer (i.e. where a polymer is neither linear nor substantially linear) would have structural units selected from:

(M)

(D)

(T)

(Q)

wherein the molecular structure would have at least 1 T unit per 100 D units, or at least 1 Q unit per every 200 D units.

The linear or substantially linear polyorganosiloxanes of the inventive method may have, in certain aspects, a solution viscosity of from about 1 mm$^2$/s to about 200 mm$^2$/s at 25° C. Good results have been obtained with polyorganosiloxanes having a solution viscosity of from about 10 mm$^2$/s to about 100 mm$^2$/s at 25° C. Good results have also been obtained with silanol-ended polydimethylsiloxanes as the polyorganosiloxane starting material.

Figure 1:
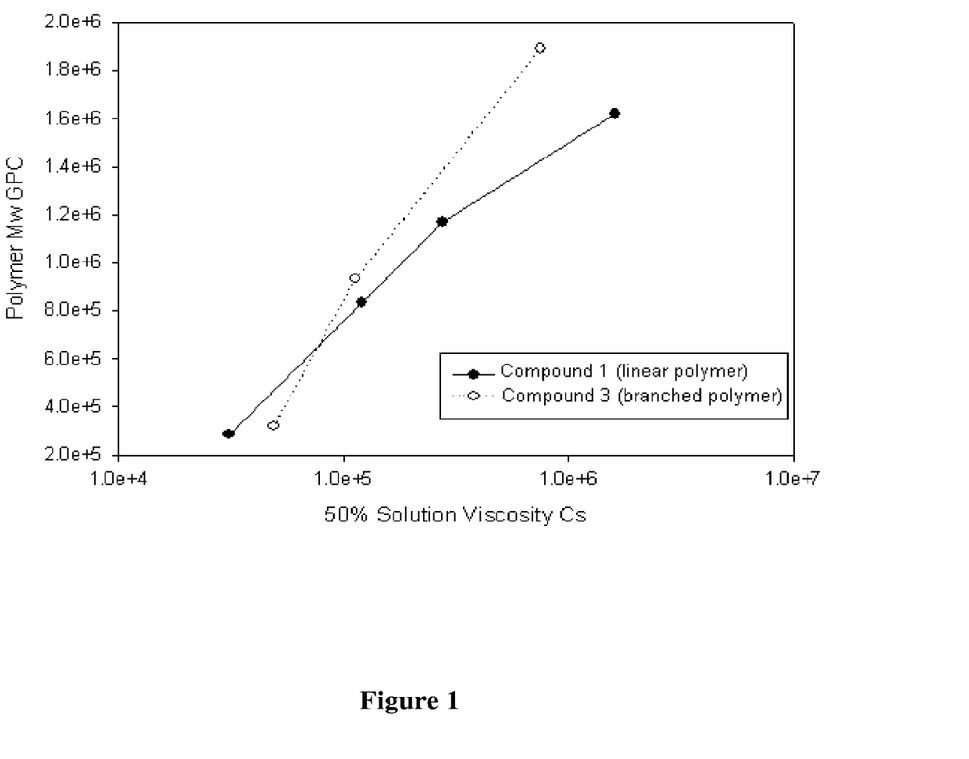
FIG. 1 illustrates that one of the attributes of adding branching to silicone polymers, particularly high molecular weight linear gum polymers, is the ability to maintain molecular weight while reducing solution viscosities. The chart shows solution viscosity plotted versus molecular weight in linear and branched dimethyl silicone polymers. The branched polymers are able to reach a considerably higher weight average molecular weight ($M_w$; measured for example, by gel permeation chromatography) at a lower solution viscosity. This also enables lower solution viscosities for PSA compositions derived from these polymers.

In some aspects, the linear or substantially linear polyorganosiloxanes undergo condensation polymerization with mixed intermediates such as methylphenyl siloxanes or methyl trifluoropropyl siloxanes, yielding co-polymers that can lead to improved PSA properties. In some aspects, the condensation polymerization reaction occurs in the presence of silanes selected to introduce branching into the silicone polymer, thereby allowing for tailoring of adhesive properties and viscosities of the resultant PSA compositions. For example, branching may be introduced into the silicone polymer by carrying out condensation polymerization in the presence of trialkoxyphenylsilanes, such as trimethoxyphenylsilane; tetraalkoxysilanes, such as tetraethoxysilane; or combinations thereof. In some aspects, PSA compositions prepared by the inventive method embody the inventors' discovery that adding branching to the silicone polymers used in PSA compositions (particularly high molecular weight gums) allows for maintenance of molecular weight while reducing solution viscosity and thereby increasing tack. Thus, in certain aspects, the PSA compositions prepared by the inventive method exhibit decreased solution viscosity and increased tack, as compared to conventionally prepared PSAs with comparable molecular weights.

In principle, any suitable condensation polymerization reaction pathway may be utilized for formation of the silicone polymer. Similarly, any suitable condensation catalyst known in the art may be mixed with the siloxane starting materials to facilitate polymerization. In certain aspects, protic acids, Lewis acids and bases, organic acids and bases, and inorganic acids and bases are used. For example, BF$_3$, FeCl$_3$, AlCl$_3$, ZnCl$_2$, and ZnBr$_2$ can be used. Alternatively, organic acids such as those having the general formula RSO$_3$H, wherein R represents an alkyl group having from 6 to 18 carbon atoms (for example, a hexyl or dodecyl group), an aryl group (for example, a phenyl group), or an alkaryl group (for example, dodecylbenzyl) can be used. Other condensation-specific catalysts include, but are not limited to, n-hexylamine, tetramethylguanidine, carboxylates of rubidium or cesium, hydroxides of potassium, sodium, magnesium, calcium or strontium, and phosphonitrile halide ion-based catalysts having the general formula $[X(PX_2=N)_zPX_3]^+$, wherein X denotes a halogen atom and wherein z is an integer from 1 to 6. In certain aspects, $[PCl_3=N-PCl_2=N-PCl_3]^+PCl_6^-$ is the catalyst used.

Typically the amount of catalyst present is from about 2 ppm to about 208 ppm (by weight, based on weight of the polyorganosiloxane), including but not limited to, about 2-12 ppm, about 12-24 ppm, about 24-36 ppm, about 36-48 ppm, about 48-60 ppm, about 60-72 ppm, about 72-84 ppm, about 84-96 ppm, about 96-108 ppm, about 108-120 ppm, about 120-136 ppm, about 136-148 ppm, about 148-160 ppm, about 160-172 ppm, about 172-184 ppm, about 184-196 ppm, and about 196-208 ppm. In some aspects, the catalyst is present in amount of from about 3 ppm to about 53 ppm, including but not limited to about 3-13 ppm, about 13-23 ppm, about 23-33 ppm, about 33-43 ppm, and about 43-53 ppm. In additional aspects, the catalyst can be present in a solvent in an amount from about 1-50% (w/w).

One of skill in the art will appreciate that condensation polymerization involves the production of water as a by-product. In certain aspects of the invention, it may or may not be necessary to remove the water formed during condensation. In some aspects, removal of water is required and is done during or after condensation polymerization but before neutralization. Methods of removing water are known in the art.

In certain aspects, the catalyst(s) chosen, desired reaction products and their properties, as well as the presence of optional end-blocking agent and/or other optional additives, may affect how reaction temperature is chosen. In some aspects, condensation polymerization is carried out at a temperature of from about 30° C. to about 110° C., including but not limited to from about 30° C.-40° C., about 40° C.-50° C., about 50° C.-60° C., about 60° C.-70° C., about 70° C.-80° C., about 80° C.-90° C., about 90° C.-100° C., and about 100° C.-110° C. In other aspects, condensation polymerization is carried out at a temperature of from about 70° C.-90° C., including but not limited to, 70° C.-75° C., about 75° C.-80° C., about 80° C.-85° C., and about 85° C.-90° C.

Where appropriate, any suitable end-blocking agent known in the art (for example, water, polymethyl siloxanes, or silanes having one group capable of reacting with the terminal groups of the polymer) can also be added to introduce the appropriate end-groups in the polymer and halt the polymerization reaction, thereby limiting the average molecular weight of the resulting silicone polymer. The end-blocking agent is present in an amount calculated to result in the desired molecular weight range of silicone polymer.

Where appropriate, any conventional additive known for use in production of silicone polymers can also be added. The additive is present in an amount calculated to result in the desired properties of the silicone polymer. Examples of additives include other solid particles or reinforcers, extenders, plasticizers, coupling agents (for example, alkoxysilanes such as tetraethoxysilane and tetraorthotitanates), cross-linking agents, and silanes (for example, trimethoxyphenylsilane, tetraethoxysilane) selected to introduce branching into the silicone polymer.

In certain aspects, condensation polymerization occurs in the presence of at least one hydrocarbon solvent. The hydrocarbon solvent can be selected from, among others, linear or branched saturated hydrocarbons, linear or branched unsaturated hydrocarbons (for example, alkenes), benzenes and substituted benzenes (for example, alkylbenzenes), cycloaliphatics (for example, cyclohexane) and substituted cycloaliphatics (for example, alkylcyclohexanes). Suitable hydrocarbon solvents include, but are not limited to, xylene, heptane, benzene, toluene, dodecane, isododecane, hexane, decane, naptha, mineral spirits, paraffins, isoparaffins, polyisobutenes, ethanol, isopropanol, butanol, ethyl acetate, amyl acetate, butyl acetate, acetone, dimethyl isosorbide, and propylene carbonate.

In other aspects, condensation polymerization occurs in the presence of at least one silicone fluid. The silicone fluid can be selected from, among others, trialkylsilyl terminated polydialkylsiloxanes and derivatives thereof which may comprise a degree of substitution, provided that any substituted groups do not participate in the polymerization reaction. Suitable silicone fluids include, but are not limited to, low molecular weight polydimethylsiloxanes and cyclosiloxanes. For example, 0.65, 1, 2 and 3 cs trimethylsilylterminated polysiloxane fluids may be useful.

The amount of hydrocarbon solvent and/or silicone fluid which may be included in the PSA composition will depend upon multiple factors, such as the intended use of the PSA and the molecular weight of the solvent and/or fluid. In general, PSA compositions can contain up to 70% w/w of solvent and/or fluid.

According to embodiments of the inventive method, the condensation polymerization reaction is allowed to continue until a silicone polymer with the desired characteristics is formed. The characteristics of the formed silicone polymer can be affected by the nature of the polyorganosiloxane starting materials, the catalyst chosen, the hydrocarbon solvent or silicone fluid chosen, the temperature of the condensation reaction, the optional addition of one or more endblockers, and/or the optional addition of one or more other additives (for example, co-monomers, extenders and plasticizers).

In certain aspects, the condensation polymerization reaction is allowed to continue until a silicone polymer is produced having lesser amounts of cyclic siloxanes present in the composition than typically obtained by other polymerization techniques, such as equilibration. In certain aspects, the silicone polymer has a concentration of less than 0.1 wt % octamethylcyclotetrasiloxanes or decamethylcyclopentasiloxanes.

In certain aspects, condensation polymerization is allowed to continue until a desired viscosity of the silicone polymer is reached, followed by addition of a neutralizing agent (where required). In some aspects, the silicone polymer formed is characterized as having a solution viscosity of from about 10,000 $mm^2$/s to about 5,000,000 $mm^2$/s at 25° C. Good results have been obtained with the formation of polymers having a solution viscosity of from about 80,000 $mm^2$/s to about 750,000 $mm^2$/s at 25° C. In some aspects, a PSA composition may comprise from about 20 weight % to about 60 weight % of a silicone polymer described herein. Typically, such a PSA comprises from about 30 weight % to about 50 weight % of silicone polymer.

According to other aspects, condensation polymerization of the polyorganosiloxanes is allowed to continue until a desired viscosity of the silicone polymer is reached, followed by addition of a silicone resin having at least one hydroxyl group capable of undergoing condensation polymerization, wherein polymerization is allowed to continue for a period of time prior to addition of a neutralizing agent (where required). An example of a suitable silicone resin is one that is soluble in at least one hydrocarbon solvent or silicone fluid, has a hydroxyl group content of from about 0.5% to about 2.5% (by weight based on resin solids content), and comprises $R_3SiO_{1/2}$ units and $SiO_{4/2}$ units in a molar ratio of from about 0.6 to about 1.5 ($R_3SiO_{1/2}$ units: $SiO_{4/2}$ units), wherein R is independently selected from a monovalent hydrocarbon or a halohydrocarbon radical having from 1 to 20 carbon atoms, an alkenyl radical, or a hydroxyl radical.

According to some embodiments of the inventive method, once the polymer mixture (i.e. silicone polymer, solvent/silicone fluid, catalyst, optional endblocker and/or other additives, optional silicone resin, and optional neutralizing agent) is formed, at least one bodying catalyst and a silicone resin having at least one hydroxyl group capable of undergoing bodying are mixed with the polymer mixture, and bodying is allowed to occur until the desired reaction product is formed. An example of a suitable silicone resin for bodying is one that is soluble in at least one hydrocarbon solvent or silicone fluid, has a hydroxyl group content of from about 0.5% to about 2.5% (by weight based on resin solids content), and comprises $R_3SiO_{1/2}$ units and $SiO_{4/2}$ units in a molar ratio of from about 0.6 to about 1.5 ($R_3SiO_{1/2}$ units: $SiO_{4/2}$ units), wherein R is independently selected from a monovalent hydrocarbon or a halohydrocarbon radical having from 1 to 20 carbon atoms, an alkenyl radical, or a hydroxyl radical. In some aspects, a silicone resin is added only during the bodying steps of the inventive method. In other aspects, the silicone resin added during the bodying steps of the method is the same as that added during the steps resulting in the formation of the silicone polymer mixture. In additional aspects, the silicone resin added during the bodying steps of the method is different from that added during the steps resulting in the formation of the silicone polymer mixture. In any case, bodying is generally allowed to continue until the desired reaction product is formed. In some aspects, a suitable PSA composition may comprise from about 40 weight % to about 80 weight % of the silicone resins described herein (i.e. inclusive of all silicone resins present without regard to steps of addition). Typically, such a PSA comprises from about 50 weight % to about 70 weight % of silicone resins.

Examples of suitable bodying temperatures include, but are not limited to, from about 40° C.-50° C., about 50° C.-60° C., about 60° C.-70° C., about 70° C.-80° C., about 80° C.-90° C., about 90° C.-100° C., about 100° C.-110° C., about 110° C.-120° C., about 120° C.-130° C., about 130° C.-140° C., and about 140° C.-150° C. Examples of periods of time suitable for bodying include, but are not limited to, from about 1-2 hours, about 2-3 hours, and about 3-4 hours.

In principle, one or more suitable bodying catalysts known in the art may be used for the bodying steps of the inventive method. Typically, the amount of bodying catalyst present is from about 1000 ppm to about 3000 ppm (by weight). In certain aspects, the bodying catalyst(s) can be selected from liquid silanol condensation catalysts having a boiling point of less than 200° C. or catalysts which are solid at room temperature. For example, such catalyst(s) can be selected from alkali metal hydroxides, alkali metal alkoxides, alkali metal carbonates, alkali metal silanolates, amines, metal salts of amines, carboxylic acids or metal salts of carboxylic acids, amines, carboxylic acid salts of organic amines, and quaternary ammonium salts. Suitable amines include, but are not limited to, primary amines exemplified by methylamine, ethylamine, propyl amine, hexylamine, butanolamine and butylamine; secondary amines exemplified by dimethylamine, diethylamine, diethanolamine, dipropylamine, dibutylamine, dihexylamine, ethylamylamine, imidazole and propylhexylamine; tertiary amines exemplified by trimethylamine, triethylamine, tripropylamine, tributylamine, trihexylamine, methyldipropylamine, tripropanolamine, pyridine, N-methylimidazole and methylpropylhexylamine. Suitable carboxylic acid salts of organic amines include, but are not limited to, diethylammonium acetate, butylammonium octoate and trimethylammonium laurate. Suitable quaternary ammonium salts include, but are not limited to, tetramethylammonium acetate, methylethyldibutylammonium chloride or dioctadecyldimethylammonium chloride. Suitable carboxylic acids include, but are not limited to, acetic acid, propanoic acid, butanoic acid, formic acid, stearic acid, tetradecanoic acid, hexadecanoic acid, dodecanoic acid, decanoic acid, benzoic acid, 3,6-dioxaheptanoic acid and 3,6,9-trioxadecanoic acid. Metal salts of carboxylic acids wherein the metal is selected from the group consisting of Li, Na, K, Ce and Ca are also suitable for use as a bodying catalyst. Suitable metal salts of carboxylic acids are exemplified by potassium formate and potassium acetate.

In addition to bodying catalyst(s), polymer stabilizers and/or neutralizers for bodying catalysts may additionally be added during or after the bodying steps. In some aspects, any high temperature polymer stabilizer/neutralizer known in the art may be added. Examples of such additives include, but are not limited to, alkylsilylphosphates such as trimethylsilylphosphate.

According to embodiments of the inventive method, once the desired reaction product is formed, it optionally undergoes curing by addition of an organic peroxide. In some aspects, the organic peroxide is selected from benzoyl peroxide and dichlorobenzoyl peroxide. In other aspects, the organic peroxide is added in an amount of from about 0.5% to about 3.5% (by weight of silicone polymer and silicone resin). In another embodiment, curing is achieved using hydrosilation reactions. Methods of curing are known in the art.

The PSA compositions formed by the inventive method are characterized as having improved performance characteristics, including but not limited to adhesion, tack, and solution viscosity, as compared to conventionally-formed PSA compositions. In certain aspects, the PSA compositions formed by the inventive method have superior performance in the hot peel test. In some aspects, the superior PSA compositions comprise linear silicone polymers, and in other aspects, the compositions comprise branched silicone polymers. With regard to PSA compositions having branched silicone polymers, the compositions exhibit lower solution viscosity and increased tack as compared to conventional PSA compositions of similar molecular weight. In yet other aspects, the PSA compositions formed by the inventive method contain less than 0.1 wt % octamethylcyclotetrasiloxanes or decamethylcyclopentasiloxanes.

Embodiments of the present invention will be better understood by reference to the following examples which are offered by way of illustration not limitation.

EXAMPLES

The present invention will be better understood by reference to the following examples which are offered by way of illustration and which one of skill in the art will recognize are not meant to be limiting.

Example 1

Formation of Silicone Polymer

A solution of 1000 grams silanol ended polydimethylsiloxane fluid (Mw 2500 g/mol) and 1000 grams xylene as a non-reactive diluent were blended in a sigma blade mixer equipped with $N_2$ purge and vacuum. The mixture was heated to 80° C. and was then catalyzed with 0.6 grams of a 5% phosphonitrosyl chloride catalyst in methylene chloride solution. The system was mixed and evacuated to remove water of condensation via azeotropic distillation. Separated xylene solvent was returned to the reactor from the condenser. The reaction proceeded until a solution viscosity of 278,000 mm$^2$/s at 25° C. was reached. This yielded a polymer (Compound 1; CAS Registry Number 70131-67-8) in xylene having a Mw of $1.17\times10^6$ g/mol as determined by Gel Permeation Chromatography or GPC (all GPC's herein used toluene solvent and calibrated using polystyrene standards). The resulting polymer contained less than 0.1 wt % octamethylcyclotetrasiloxanes.

Example 2

Formation of Silicone Polymer

A solution of 900 grams of silanol ended polydimethylsiloxane fluid (Mw 2500 g/mol) and 100 grams of diphenylsilane diol (Mw 216 g/mol) and 1000 grams xylene as a non-reactive diluent were blended in a sigma blade mixer equipped with N$_2$ purge and vacuum. The mixture was heated to 80° C. and was then catalyzed with 0.6 grams of a 5% phosphonitrosyl chloride catalyst in methylene chloride solution. The system was mixed and evacuated to remove water of condensation via azeotropic distillation. Separated xylene solvent was returned to the reactor from the condenser. The reaction proceeded until a solution viscosity of 82,000 mm$^2$/s at 25° C. was reached. This yielded a polymer (Compound 2; CAS Registry Number 68931-93-9) in xylene having a Mw of $9.02\times10^5$ g/mol as determined by GPC and having less than 0.1 wt % octamethylcyclotetrasiloxanes.

Example 3

Formation of Silicone Polymer

A solution of 999.7 grams of silanol ended polydimethylsiloxane fluid (Mw 2500 g/mol) and 0.3 grams of tetraethoxysilane (Mw 208 g/mol) and 1000 grams xylene as a non-reactive diluent were blended in a sigma blade mixer equipped with N$_2$ purge and vacuum. The mixture was heated to 80° C. and was then catalyzed with 0.6 grams of a 5% phosphonitrosyl chloride catalyst in methylene chloride solution. The system was mixed and evacuated to remove water of condensation as well as ethanol via azeotropic distillation. Separated xylene solvent was returned to the reactor from the condenser. The reaction proceeded until a solution viscosity of 749,000 mm$^2$/s at 25° C. was reached. This yielded a polymer (Compound 3) in xylene having a Mw of $1.89\times10^6$ g/mol as determined by GPC and having less than 0.1 wt % octamethylcyclotetrasiloxanes.

Example 4

Formation of Silicone Polymer

A solution of 900 grams of silanol ended polydimethylsiloxane fluid (Mw 2500 g/mol) and 100 grams of silanol ended polyphenylmethylsiloxane fluid (Mw 543 g/mol) and 1000 grams xylene as a non-reactive diluent were blended in a sigma blade mixer equipped with N$_2$ purge and vacuum. The mixture was heated to 80° C. and was then catalyzed with 0.6 grams of a 5% phosphonitrosyl chloride catalyst in methylene chloride solution. The system was mixed and evacuated to remove water of condensation via azeotropic distillation. Separated xylene solvent was returned to the reactor from the condenser. The reaction proceeded until a solution viscosity of 114,000 mm$^2$/s at 25° C. was reached. This yielded a polymer (Compound 4) in xylene having a Mw of $1.06\times10^6$ g/mol as determined by GPC and having less than 0.1 wt % octamethylcyclotetrasiloxanes.

Example 5

Formation of Silicone Polymer

A solution of 900 grams of silanol ended polydimethylsiloxane fluid (Mw 2500 g/mol) and 100 grams of silanol ended polytrifluoropropylmethylsiloxane fluid (Mw 577 g/mol) and 1000 grams xylene as a non-reactive diluent were blended in a sigma blade mixer equipped with N$_2$ purge and vacuum. The mixture was heated to 80° C. and was then catalyzed with 0.6 grams of a 5% phosphonitrosyl chloride catalyst in methylene chloride solution. The system was mixed and evacuated to remove water of condensation via azeotropic distillation. Separated xylene solvent was returned to the reactor from the condenser. The reaction proceeded until a solution viscosity of 326,000 mm$^2$/s at 25° C. was reached. This yielded a polymer (Compound 5) in xylene having a Mw of $1.35\times10^6$ g/mol as determined by GPC and having less than 0.1 wt % octamethylcyclotetrasiloxanes.

Example 6 PSA

Formation of PSA Composition

A solution of 203 grams of Compound 1 was combined with 177 grams of a 70% solids trimethylsiloxylated silicic acid (MQ resin) in xylene (Mw 20000 g/mol), 19 grams of additional xylene, 0.8 grams benzoic acid, 0.1 grams trimethylsilylphosphate in a 0.5 liter 3 necked round bottom flask equipped with N$_2$ purge, mechanical stirring and a Dean Stark water trap filled with xylene. The mixture was refluxed at 143° C. for 3 hours to remove condensed water. The resulting PSA (Compound 6; CAS Registry Number 68440-70-0) was 83000 mm$^2$/s at 25° C. viscosity at 56.5% solids, and had a GPC with multimodal resin and polymer peaks.

Example 7 PSA

Formation of PSA Composition

A solution of 215 grams of Compound 2 was combined with 177 grams of a 70% solids trimethylsiloxylated silicic acid (MQ resin) in xylene (Mw 20000 g/mol), 6 grams of additional xylene, 0.8 grams benzoic acid, 0.1 grams trimethylsilylphosphate in a 0.5 liter 3 necked round bottom flask equipped with N$_2$ purge, mechanical stirring and a Dean Stark water trap filled with xylene. The mixture was refluxed at 143° C. for 3 hours to remove condensed water. The resulting PSA (Compound 7; CAS Registry Number 68440-62-2) was 12000 mm$^2$/s at 25° C. viscosity at 56.5% solids, and had a GPC with multimodal resin and polymer peaks.

Example 8 PSA

Formation of PSA Composition

A solution of 187 grams of Compound 3 was combined with 189 grams of a 70% solids trimethylsiloxylated silicic acid (MQ resin) in xylene (Mw 20000 g/mol), 27 grams of additional xylene, 0.8 grams benzoic acid, 0.1 grams trimethylsilylphosphate in a 0.5 liter 3 necked round bottom flask equipped with N$_2$ purge, mechanical stirring and a Dean Stark water trap filled with xylene. The mixture was refluxed at 143° C. for 3 hours to remove condensed water. The resulting PSA (Compound 8) was 25000 mm$^2$/s at 25° C. viscosity at 56.5% solids, and had a GPC with multimodal resin and polymer peaks.

Example 9 PSA

Formation of PSA Composition

A solution of 187 grams of Compound 4 was combined with 187 grams of a 70% solids trimethylsiloxylated silicic acid (MQ resin) in xylene (Mw 20000 g/mol), 25 grams of additional xylene, 0.8 grams benzoic acid, 0.1 grams trimethylsilylphosphate in a 0.5 liter 3 necked round bottom flask equipped with N$_2$ purge, mechanical stirring and a Dean Stark water trap filled with xylene. The mixture was refluxed at 143° C. for 3 hours to remove condensed water. The resulting PSA (Compound 9) was 11000 mm$^2$/s at 25° C. viscosity at 56.5% solids, and had a GPC with multimodal resin and polymer peaks.

Example 10 PSA

Formation of PSA Composition

A solution of 195 grams of Compound 4 was combined with 188 grams of a 70% solids trimethylsiloxylated silicic acid (MQ resin) in xylene (Mw 20000 g/mol), 14 grams of additional xylene, 0.8 grams benzoic acid, 0.1 grams trimethylsilylphosphate in a 0.5 liter 3 necked round bottom flask equipped with N$_2$ purge, mechanical stirring and a Dean Stark water trap filled with xylene. The mixture was refluxed at 143° C. for 3 hours to remove condensed water. The resulting PSA (Compound 10) was 33,300 mm$^2$/s at 25° C. viscosity at 56.5% solids, and had a GPC with multimodal resin and polymer peaks.

Example 11

Testing of the PSA Samples

PSA's were formulated to contain 2% by weight benzoyl peroxide by the addition of a 10 wt % toluene solution of benzoyl peroxide and coated to a 28-35 micrometers dry film thickness on 50 micrometers polyester film backing for tack and adhesion measurements. The adhesive formulations were coated from xylene solution, dried for 2 minutes at 90° C., and then cured for 2 minutes at 178° C. in forced air ovens. Tack testing was done per ASTM 2979 for measuring probe tack with units of grams force at 1.0 seconds dwell with a 20 gram weight and a 5 mm stainless steel probe tip moving at 5 mm/second. Adhesion testing was done per ASTM 3359-08 measuring adhesion to mirrored stainless steel plates at 180 degrees peel angle and reported as grams/25.4 mm width at a peel velocity of 0.3 m/minute. For comparison purposes, two conventional, commercially-available silicone PSAs were also coated, cured and tested for adhesive properties and performance. One was a general purpose silicone adhesive, and one was stabilized for high temperature applications. The results are as shown in Table 1.

TABLE 1

Adhesion and Tack Values for PSA Compositions

| Compound | PSA film thickness (μm) | Probe Tack (g) | Adhesion (g) |
| --- | --- | --- | --- |
| Compound 6 | 33.2 | 873.3 | 1237 |
| Compound 7 | 31.5 | 1205.4 | 1340 |
| Compound 8 | 30.3 | 1092.3 | 1287 |
| Compound 9 | 29.7 | 1284.6 | 1134 |
| Compound 10 | 30.5 | 1019.4 | 1282 |
| DC7406 Adhesive (commercial general purpose adhesive) | 31 | 850 | 1044 |
| DC7566 Adhesive (commercial high Temperature adhesive) | 29.8 | 865 | 868 |

Example 12

Formation of Silicone Polymer

A solution of 998 grams silanol ended polydimethylsiloxane fluid (Mw 2500 g/mol), 2 grams silanol ended polymethylvinyldimethylsiloxane fluid (Mw 432 g/mol) and 1000 grams xylene as a non-reactive diluent were blended in a sigma blade mixer equipped with N2 purge and vacuum. The mixture was heated to 80° C. and was then catalyzed with 0.6 grams of a 5% phosphonitrosyl chloride catalyst in methylene chloride solution. The system was mixed and evacuated to remove water of condensation via azeotropic distillation. Separated xylene solvent was returned to the reactor from the condenser. The reaction proceeded until a solution viscosity of 223,000 mm$^2$/s at 25° C. was reached. This yielded a polymer (Compound 12; CAS Registry Number 67923-19-7) in xylene having a Mw of 0.95×10$^6$ g/mol and having less than 0.1 wt % octamethylcyclotetrasiloxanes.

The present invention should not be considered limited to the specific examples described herein, but rather should be understood to cover all aspects of the invention. Various modifications and equivalent processes, as well as numerous structures and devices, to which the present invention may be applicable, will be readily apparent to those of skill in the art. Those skilled in the art will understand that various changes may be made without departing from the scope of the invention, which is not to be considered limited to what is described in the specification.

The invention claimed is:

1. A method of obtaining a silicone pressure-sensitive adhesive composition comprising the sequential steps of:
   (I) forming a polymer mixture comprising:
      (A) forming a silicone polymer by condensation polymerization of at least one polyorganosiloxane in the presence of at least one hydrocarbon solvent or silicone fluid,
   wherein the at least one polyorganosiloxane has an average solution viscosity of from about 1 mm$^2$/s to about 200 mm$^2$/s at 25° C. and at least one hydroxyl group capable of undergoing condensation polymerization,
   wherein polymerization is facilitated by addition of at least one condensation catalyst and occurs at a temperature of from about 30° C. to about 110° C., wherein the silicone polymer formed has a solution viscosity of from about 10,000 mm$^2$/s to about 5,000,000 mm$^2$/s at 25° C. and has a molecular weight greater than 1,000,000 g/mol and wherein the polymer mixture includes the silicone polymer;

(B) optionally, including a silicone resin that has at least one hydroxyl group capable of undergoing condensation polymerization and that is soluble in at least one hydrocarbon solvent or silicone fluid,
wherein the resin has a hydroxyl group content of from about 0.5% to about 2.5% (by weight based on resin solids content),
wherein the resin comprises $R_3SiO_{1/2}$ units and $SiO_{4/2}$ units in a molar ratio of from about 0.6 to about 1.5 ($R_3SiO_{1/2}$ units: $SiO_{4/2}$ units),
wherein R is independently selected from a monovalent hydrocarbon or a halohydrocarbon radical having from 1 to 20 carbon atoms, an alkenyl radical, or a hydroxyl radical and wherein the polymer mixture optionally includes the silicone resin; and
(C) optionally, including a neutralizing agent, wherein the neutralizing agent is added in an amount sufficient to neutralize the condensation catalyst and wherein the polymer mixture optionally includes the neutralizing agent;
(II) mixing with the polymer mixture of (I), at least one bodying catalyst and a silicone resin that has at least one hydroxyl group capable of undergoing bodying; and then allowing a bodying reaction to occur at a temperature of from about 40° C. to about 145° C. to form the silicone pressure-sensitive adhesive composition,
wherein the resin is soluble in at least one hydrocarbon solvent or silicone fluid,
wherein the resin has a hydroxyl group content of from about 0.5% to about 2.5% (by weight based on resin solids content),
wherein the silicone resin comprises $R_3SiO_{1/2}$ units and $SiO_{4/2}$ units in a molar ratio of from about 0.6 to about 1.5 ($R_3SiO_{1/2}$ units: $SiO_{4/2}$ units), and
wherein R is independently selected from a monovalent hydrocarbon or a halohydrocarbon radical having from 1 to 20 carbon atoms, an alkenyl radical, or a hydroxyl radical; and
(III) optionally, adding to the silicone pressure-sensitive adhesive composition of (II) from about 0.5% to about 3.5% (by weight) of an organic peroxide.

2. A method according to claim 1, wherein the polyorganosiloxane is generally characterized by the formula wherein $R^1$ is independently selected from hydrogen, methyl, ethyl, propyl, isopropyl, butyl, sec-butyl, iso-butyl, tert-butyl, perfluorobutylethyl, phenyl ethyl, chloropropyl, fluoropropyl, vinyl, and phenyl and $R^2$ and $R^3$ are each independently selected from methyl, ethyl, propyl, isopropyl, butyl, sec-butyl, iso-butyl, tert-butyl, perfluorobutylethyl, phenyl ethyl, chloropropyl, fluoropropyl, vinyl, and phenyl; and wherein x is an integer with a value of at least 2.

3. A method according to claim 2, wherein the polyorganosiloxane is polydimethylsiloxane.

4. A method according to claim 1, wherein the polyorganosiloxane has a solution viscosity of from about 10 $mm^2$/s to about 100 $mm^2$/s at 25° C.

5. A method according to claim 1, wherein the at least one hydrocarbon solvent or silicone fluid is selected from xylene, heptane, benzene, toluene, naptha, mineral spirits, polydimethylsiloxane, isododecane, hexane, and decane.

6. A method according to claim 1, wherein the condensation catalyst is selected from $[PCl_3=N-PCl_2=N-PCl_3]^+$ $PCl_6^-$.

7. A method according to claim 1, wherein the silicone polymer has an average viscosity of from about 80,000 $mm^2$/s to about 750,000 $mm^2$/s at 25° C.

8. A method according to claim 7, wherein the pressure-sensitive adhesive has from about 20% to about 60% (by weight) of a silicone polymer.

9. A method according to claim 1, wherein the silicone resin of step (I)(B) undergoes condensation polymerization with the silicone polymer prior to addition of the neutralizing agent.

10. A method according to claim 9, wherein the silicone resin of step (I)(B) is the same as the silicone resin of step (II).

11. A method according to claim 9, wherein the silicone resin of step (I)(B) is different from the silicone resin of step (II).

12. A method according to claim 1, wherein the pressure-sensitive adhesive has from about 40% to about 80% (by weight) of silicone resins.

13. A method according to claim 1, wherein the organic peroxide of step (III) is selected from benzoyl peroxide and dichlorobenzoyl peroxide.

14. A method according to claim 1, wherein the pressure-sensitive adhesive has less than 0.1 wt % octamethylcyclotetrasiloxanes or decamethylcyclopentasiloxanes.

15. A method according to claim 1, wherein the silicone polymer of step (I)(A) comprises branched polyorganosiloxanes.

16. A method according to claim 15, wherein forming the silicone polymer of step (I)(A) comprises forming the silicone polymer by condensation polymerization in the presence of trialkoxyphenylsilanes, tetraalkoxysilanes, or combinations thereof.

17. A method according to claim 16, wherein forming the silicone polymer of step (I)(A) comprises forming the silicone polymer by condensation polymerization in the presence of trimethoxyphenylsilane, tetraethoxysilane, or combinations thereof.

18. A method according to claim 1, wherein the silicone polymer is present in an amount of 50% by weight in solvent.

* * * * *